(12) United States Patent
Yan et al.

(10) Patent No.: US 12,013,414 B2
(45) Date of Patent: Jun. 18, 2024

(54) MEMS ACCELEROMETER

(71) Applicant: AAC Kaitai Technologies (Wuhan) CO., LTD, Hubei (CN)

(72) Inventors: Shitao Yan, Shenzhen (CN); Zhan Zhan, Shenzhen (CN); Shan Yang, Shenzhen (CN); Zhao Ma, Shenzhen (CN); Xiao Kan, Shenzhen (CN); Hongtao Peng, Shenzhen (CN); Yang Li, Shenzhen (CN); Veronica Tan, Singapore (SG); Yan Hong, Shenzhen (CN); Kahkeen Lai, Singapore (SG)

(73) Assignee: AAC KAITAI TECHNOLOGIES (WUHAN) CO., LTD, Wuhan (CN)

( * ) Notice: Subject to any disclaimer, the term of this patent is extended or adjusted under 35 U.S.C. 154(b) by 43 days.

(21) Appl. No.: 17/879,813

(22) Filed: Aug. 3, 2022

(65) Prior Publication Data

US 2023/0228788 A1 Jul. 20, 2023

(30) Foreign Application Priority Data

Jan. 14, 2022 (CN) .......................... 202210040635.9

(51) Int. Cl.
*G01P 15/125* (2006.01)
*G01P 15/08* (2006.01)
*G01P 15/18* (2013.01)

(52) U.S. Cl.
CPC ........ *G01P 15/125* (2013.01); *G01P 15/0802* (2013.01); *G01P 15/18* (2013.01); *G01P 2015/0848* (2013.01); *G01P 2015/086* (2013.01)

(58) Field of Classification Search
CPC .... G01P 15/125; G01P 15/18; G01P 15/0802; G01P 2015/086; G01P 2015/0848; G01P 2015/0831; G01P 2015/0862
See application file for complete search history.

(56) References Cited

U.S. PATENT DOCUMENTS

| | | | | |
|---|---|---|---|---|
| 2010/0122579 A1* | 5/2010 | Hsu | .......................... | G01P 15/18 73/514.32 |
| 2011/0031959 A1* | 2/2011 | Konno | ................ | G01P 15/0802 324/162 |
| 2012/0000287 A1* | 1/2012 | Frangi | .................... | G01P 15/125 73/514.32 |
| 2013/0125649 A1* | 5/2013 | Simoni | ................... | G01P 15/18 73/504.04 |

(Continued)

*Primary Examiner* — Helen C Kwok
(74) *Attorney, Agent, or Firm* — W&G Law Group

(57) ABSTRACT

A MEMS accelerometer includes a base, proof mass, at least one pair of seesaw structures, and an out-of-plane displacement detection component. The at least one pair of the seesaw structures are oppositely disposed and fixed on the base through anchor points, and the out-of-plane displacement detection component is configured to detect rotation of the at least one pair of the seesaw structures or out-of-plane linear motion of the proof mass. Linear displacement of the MEMS accelerometer is not only beneficial to improve linearity of a capacitive displacement detection, but also to other non-capacitive detection methods, such as optical displacement detection. In addition, a double coupling structure is adopted to jointly couple rotation of seesaws, and remaining translational and rotational modes of the seesaw structures are suppressed.

11 Claims, 13 Drawing Sheets

(56) References Cited

U.S. PATENT DOCUMENTS

| | | | | |
|---|---|---|---|---|
| 2014/0069190 A1* | 3/2014 | Tanaka | G01P 15/0802 | |
| | | | 156/60 | |
| 2014/0298909 A1* | 10/2014 | Simoni | G01P 15/125 | |
| | | | 73/514.32 | |
| 2015/0268269 A1* | 9/2015 | Jia | G01P 15/125 | |
| | | | 73/514.32 | |
| 2016/0214853 A1* | 7/2016 | Thompson | B81B 3/0016 | |
| 2016/0305780 A1* | 10/2016 | Comi | G01P 15/097 | |
| 2016/0334438 A1* | 11/2016 | Thompson | B81B 3/0086 | |
| 2018/0275161 A1* | 9/2018 | Tang | G01P 15/125 | |
| 2020/0096538 A1* | 3/2020 | Zhang | G01P 15/0802 | |
| 2020/0166536 A1* | 5/2020 | Takizawa | G01C 19/5705 | |
| 2020/0355722 A1* | 11/2020 | Zou | G01P 15/0802 | |
| | | | 156/60 | |
| 2021/0063432 A1* | 3/2021 | Fujimoto | G01P 15/125 | |
| | | | 73/514.32 | |
| 2021/0072280 A1* | 3/2021 | Liukku | G01P 15/125 | |
| | | | 73/514.32 | |
| 2023/0003759 A1* | 1/2023 | Liukku | G01P 15/125 | |
| | | | 73/514.32 | |

\* cited by examiner

MEMS ACCELEROMETER

TECHNICAL FIELD

The present disclosure relates to the field of Micro-Electro-Mechanical-Systems (MEMS), and in particular to a MEMS accelerometer.

BACKGROUND

Conventional out-of-plane acceleration sensors use a seesaw structure to check out-of-plane displacement. As shown in FIG. 1, the seesaw structure includes anchor points 101, torsion springs 102, out-of-plane detection plates 105, and proof masses M1 107, center of mass 106, rotation axis 103. While the seesaw structure is under an action of acceleration, an asymmetric proof mass M1 107 drives the torsion spring 102 to rotate along a rotation axis 103 formed by the torsion springs 102 and the anchor points 101, and a capacitance detection plate 105 is respectively disposed above or below the seesaw structure to form a differential capacitance. Acceleration changes are obtained by detecting capacitance changes.

As shown in FIG. 2, due to a fact that the seesaw structure is asymmetric, the seesaw structure swings in-of-plane X direction under the action of an X direction acceleration.

In response to above problems, Murata's US patent No. 20200018777A discloses a structure adopting two seesaws. A main body of a rotating proof mass is disposed on the seesaw structure, and a rigid body is externally added as a coupling structure and further as a linear mass. When an out-of-plane acceleration acts, a linear mass linearly moves toward an out-of-plane direction. This structure sets a detection plate far away from a rotation axis, which ensures gain of the capacitance change due to rotation, and eliminates swing along an X direction (IP1 direction), but cannot suppress rotations of the two seesaws in a same direction around a Z axis (OP) and rotations of the two seesaws in a same direction around an X axis (IP1 axis).

ADI's US patent No. 20200132716A1 discloses a multi-axis accelerometer, an out-of-plane accelerometer of which adopts a butterfly structure. That is, an inner coupling structure implements motion coupling of two seesaw structures, which can suppress in-of-plane rotation of a single seesaw structure and rotation in a same direction of the seesaw structures around an axis. Compared with the structure of Murata, the multi-axis accelerometer has no linear proof mass for Z-axis linear motion as an outer coupling structure, which ability to suppress reverse movement of the two seesaw structures around a Z-axis is poor.

SUMMARY

The present disclosure aims to provide a MEMS accelerometer to solve at least one of the above technical problems.

In order to achieve above aims, the present disclosure provides a MEMS accelerometer, including a base, proof mass, at least one pair of seesaw structures, and an out-of-plane displacement detection component. The at least one pair of the seesaw structures are oppositely disposed and fixed on the base through anchor points, and the out-of-plane displacement detection component is configured to detect rotation of the at least one pair of the seesaw structures or out-of-plane linear motion of the proof mass.

The at least one pair of the seesaw structures is coupled and connected to each other on a first side of the at least one pair of the seesaw structures through a first coupling structure, a second coupling structure is disposed on a second side of the at least one pair of the two seesaw structures through the first coupling structure, the proof mass is connected to the first coupling structure and/or the second coupling structure, the first coupling structure and the second coupling structure are elastic coupling structures.

As an improvement, the proof mass is connected to the first coupling structure or the proof mass is connected to the second coupling structure.

As an improvement, the at least one pair of seesaw structures includes a first seesaw structure and a second seesaw structure. The first seesaw structure includes a first anchor point, a first elastic torsion spring, and a first connecting beam. The first anchor point is fixed to the base, the first elastic torsion spring is fixed to the first anchor point, and the first connecting beam is disposed across two sides of the first elastic torsion spring. A first end of the first connecting beam is connected to the first elastic torsion spring, where the first end is far away from the first coupling structure, and a second end of the first connecting beam is connected to the second coupling structure. The second seesaw structure includes a second anchor point, a second elastic torsion spring, and a second connecting beam. A first end of the second anchor point is fixed to the base, the second elastic torsion spring is fixed to a second end of the second anchor point, and the second connecting beam is disposed on one side of the second elastic torsion spring. A first end of the second connecting beam is connected to the second elastic torsion spring, where the first end of the second connecting beam is far away from the first coupling structure, and a second end of the second connecting beam is connected to other one second coupling structure. And the second coupling structure is connected to the proof mass.

As an improvement, the pair of the seesaw structures includes a first seesaw structure and a second seesaw structure. The first seesaw structure includes a first anchor point, a first elastic torsion spring, a first electrode plate disposing portion A, and a first electrode plate disposing portion B. The first anchor point is fixed to the base, the first elastic torsion spring is fixed to the first anchor point, and the first electrode plate disposing portion A and the first electrode plate disposing portion B are oppositely disposed on two sides of the first elastic torsion spring, the first electrode plate disposing portion A and the first electrode plate disposing portion B are respectively connected to the first elastic torsion spring via a first coupling beam. The out-of-plane displacement detection component includes a first out-of-plane detection electrode plate A disposed on the first electrode plate disposing portion A and a first out-of-plane detection electrode plate B disposed on the first electrode plate disposing portion B. The second seesaw structure includes a second anchor point, a second elastic torsion spring, a second electrode plate disposing portion A, and a second electrode plate disposing portion B. A first end of the send anchor point is fixed to the base, the second elastic torsion spring is fixed to a second end of the second anchor point, and the second electrode plate disposing portion A and the second electrode plate disposing portion B are oppositely disposed on two sides of the second elastic torsion spring, the second electrode plate disposing portion A and the second electrode plate disposing portion B are respectively connected to the second elastic torsion spring via a second coupling beam. The out-of-plane displacement detection component includes a second out-of-plane detection electrode plate A disposed on the second electrode plate disposing portion A and a second out-of-plane detection electrode plate B disposed on the second electrode plate disposing portion B.

As an improvement, the first electrode plate disposing portion B is disposed between the second electrode plate disposing portion B and the second elastic torsion spring. The second electrode plate disposing portion B is disposed between the first electrode plate disposing portion B and the first elastic torsion spring, thus forming a structure in which the first electrode plate disposing portions B of the first seesaw structure and the second electrode plate disposing portions B of the second seesaw structure are nested with each other, the first coupling structure is disposed between the first electrode plate disposing portion B and the second electrode plate disposing portion B, where the first electrode plate disposing portion B and the second electrode plate disposing portion B are nested with each other.

As an improvement, a first bending portion is disposed on the first connecting beam to avoid the second electrode plate disposing portion B, and a second bending portion is disposed on the second connecting beam to avoid the first plate disposing portion B.

As an improvement, the out-of-plane detection component is a Z-axis displacement detection component, X-axis displacement detection components and/or Y-axis displacement detection components are disposed between the first electrode plate disposing portion A and the first elastic torsion spring and between the second electrode plate disposing portion A and the second elastic torsion spring.

As an improvement, the out-of-plane detection component is a Z-axis displacement detection component; X-axis displacement detection components and/or Y-axis displacement detection components are respectively disposed in a first accommodation space A, a first accommodation space B, a second accommodation space A, and a second accommodation space B.

As an improvement, the MEMS accelerometer further includes two pairs of the seesaw structures oppositely disposed, the two pairs of the seesaw structures share the same first coupling structure.

As an improvement, the second coupling structure is an elastic coupling structure having at least one bent portion.

As an improvement, the proof mass includes a first proof mass and a second proof mass, the first coupling structure and the second coupling structure are respectively connected to the first proof mass and the second proof mass.

As an improvement, the pair of the seesaw structures includes a first seesaw structure and a second seesaw structure. The first seesaw structure includes a first anchor point, a first elastic torsion spring, and a first connecting beam. The first elastic torsion spring is fixed to the first anchor point, and the first connecting beam is disposed across two sides of the first elastic torsion spring. A first end of the first connecting beam is connected to the first elastic torsion spring, and a second end of the first connecting beam is connected to one of the second coupling structure. The second seesaw structure includes a second anchor point, a second elastic torsion spring, a second connecting beam. The second elastic torsion spring is fixed to the second anchor point, and the second connecting beam is disposed on one side of the second elastic torsion spring. A first end of the second connecting beam is connected to the second elastic torsion spring, and a second end of the second connecting beam is connected to other one of the second coupling structure. A first accommodation space A is formed among the first elastic torsion spring, the second coupling structure disposed on one side of the first seesaw structure, and the first connecting beam. A first accommodating space B is formed among the first elastic torsion spring, the first coupling structure, and the first connecting beam.

A second accommodating space A is formed among the second elastic torsion spring, the second coupling structure disposed on one side of the first seesaw structure, and the second connecting beam. A second accommodating space B is formed among the second elastic torsion spring, the first coupling structure, and the first connecting beam.

A first electrode plate disposing portion A is disposed in the first accommodating space A, where the electrode plate disposing portion A extends from the second proof mass, and a first electrode plate disposing portion B is disposed in the first accommodating space B, where the first electrode plate disposing portion B extends from the first proof mass. The out-of-plane displacement detection component includes a first out-of-plane detection plate A disposed on the first electrode plate disposing portion A and a first out-of-plane detection plate B disposed on the first electrode plate disposing portion B.

A second electrode plate disposing portion A is disposed in the second accommodating space A, where the second electrode plate disposing portion A extends from the second proof mass, and a second electrode plate disposing portion B is disposed in the second accommodating space B, where the second electrode plate disposing portion B extends from the first proof mass, the out-of-plane displacement detection component includes a second out-of-plane detection plate A disposed on the second electrode plate disposing portion A and a second out-of-plane detection plate B disposed on the second electrode plate disposing portion B.

As an improvement, the MEMS accelerometer further includes two pairs of the seesaw structures disposed oppositely to each other, the two pairs of seesaw structures share a same first coupling structure.

Compared with the related art, in the MEMS accelerometer of each embodiment of the present disclosure, two or more seesaw structures are adopted as structures supporting the proof mass, so that the proof mass linearly moves along the Z axis under an action of acceleration in an out-of-plane direction (Z direction), this linear displacement is not only beneficial to improve the linearity of a capacitive displacement detection, but also to other non-capacitive detection methods, such as optical displacement detection. In addition, in the embodiment of the present disclosure, a double coupling structure (a first coupling structure and a second coupling structure) is adopted to jointly couple the rotation of the seesaws, and the remaining translational and rotational modes of the seesaw structures are suppressed. Furthermore, in embodiments of the present disclosure, the proof mass is mainly disposed on the second coupling structure (outside) (it may also be the first coupling structure inside), and the seesaw structure is disposed with a small amount or no rotating proof masses, so that a mass center of the seesaw structure is close to or at an axis of rotation. This arrangement of proof mass results in a more concentrated mass, a more reasonable structure, and fewer spurious modes.

BRIEF DESCRIPTION OF THE DRAWINGS

In order to more clearly illustrate technical solutions in embodiments of the present disclosure, the drawings required in the description of the embodiments will be briefly introduced below. Obviously, the drawings in the following description are merely some embodiments of the present disclosure, and those of ordinary skill in the art may obtain other drawings according to these drawings without creative efforts and in which.

DETAILED DESCRIPTION OF EMBODIMENTS

The technical solutions of the embodiments of the present disclosure are clearly and completely described below with reference to the drawings in the embodiments of the present disclosure. Obviously, the described embodiments are merely some rather than all of the embodiments of the present disclosure. All other embodiments obtained by those of ordinary skill in the art based on the embodiments of the present disclosure without creative efforts shall fall within the protection scope of the present disclosure.

First Embodiment

Figure 1:
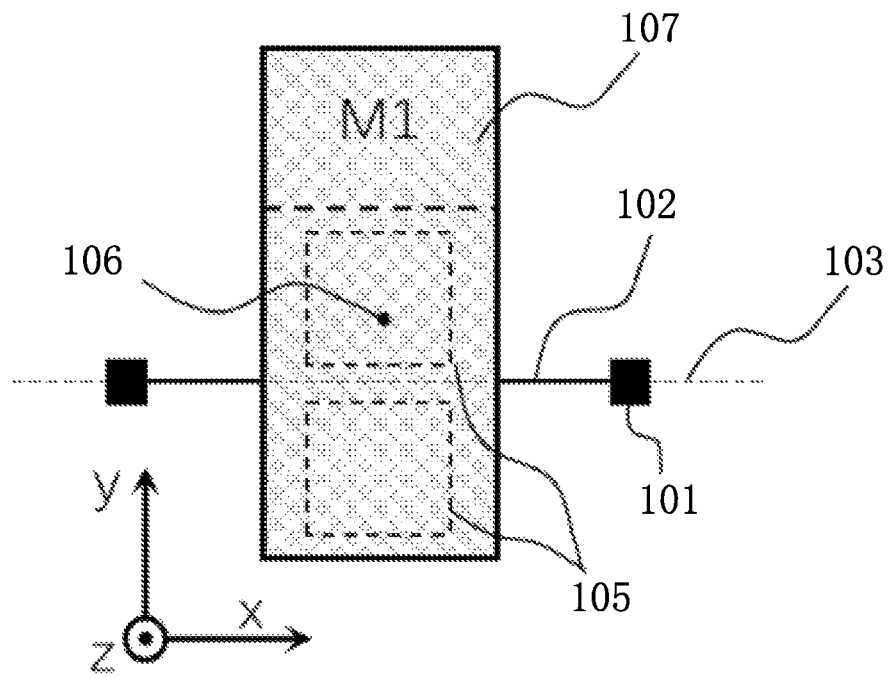
FIG. 1 is a structural diagram of an out-of-plane accelerometer in the related art.
Figure 2:
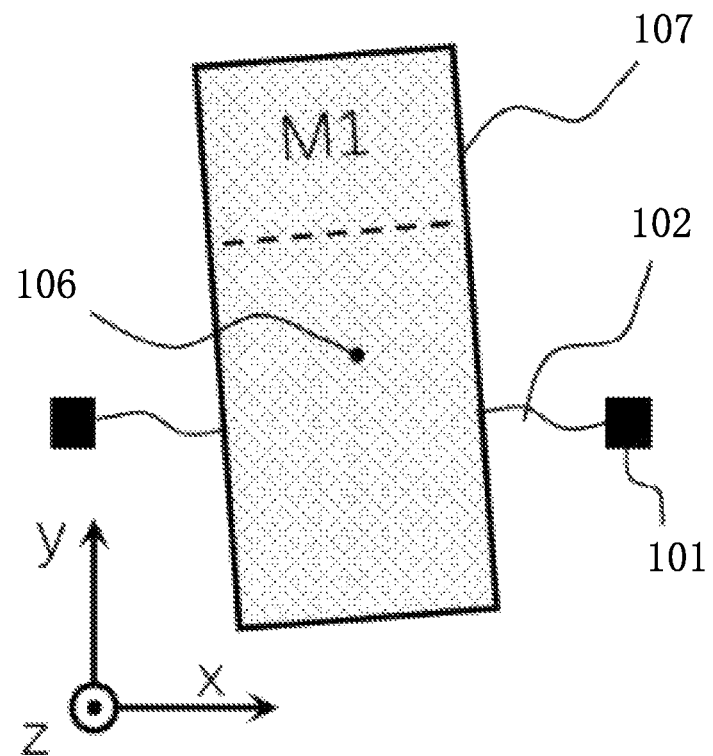
FIG. 2 is a schematic diagram of the accelerometer in FIG. 1 in a motion state.
Figure 3:
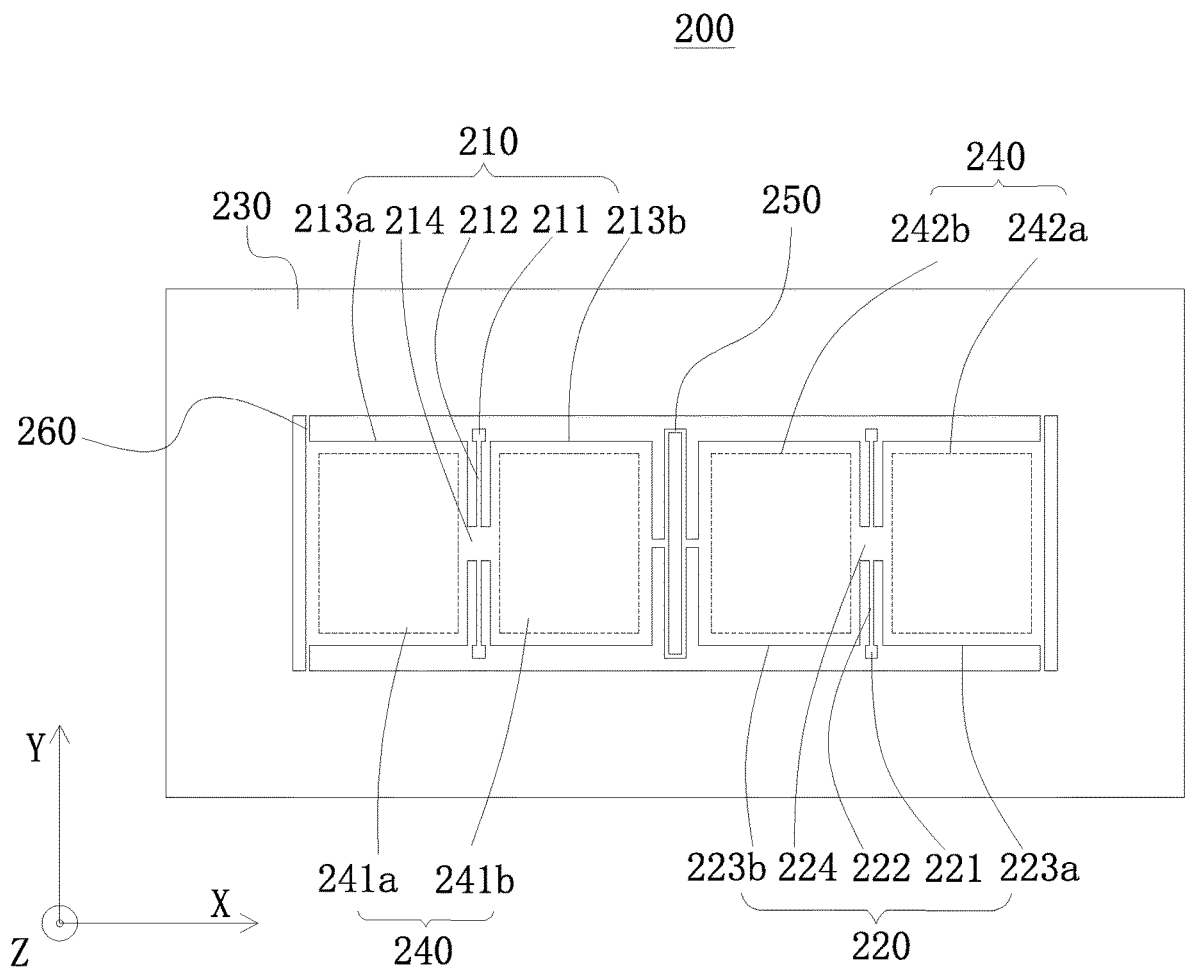
FIG. 3 is a schematic diagram of an accelerometer according to a first embodiment of the present disclosure.
Figure 4:
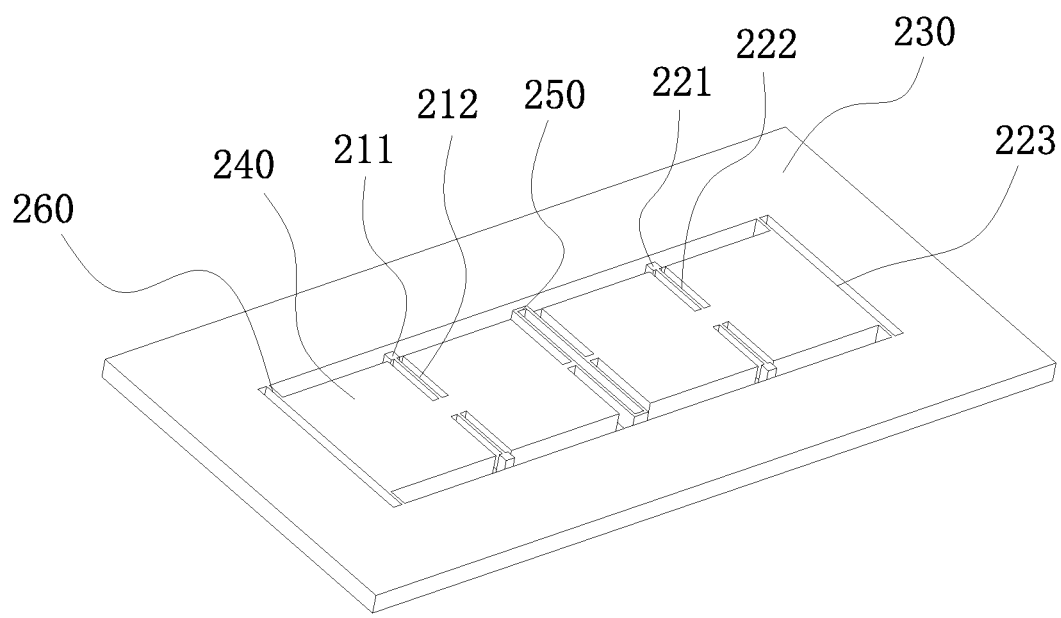
FIG. 4 is a schematic diagram of the accelerometer according to the first embodiment in one other view.

Please refer together to FIGS. 3-4, a MEMS accelerometer 200 is provided by the embodiment, and includes: a proof mass 230, at least a pair of seesaw structures (210, 220) disposed oppositely, a base (not shown), and an out-of-plane displacement detection component 240. The out-of-plane displacement detection component 240 is configured to detect a rotation of the seesaw structure (210, 220) or an out-of-plane linear motion of the proof mass 230.

Every two seesaw structures (210, 220) disposed oppositely are coupled and connected to each other on a first side through a first coupling structure 250 to form a symmetrical arrangement. A second coupling structure 260 is disposed on a second side of the two seesaw structures (210, 220) coupled and connected to each other through the first coupling structure 250. In the embodiment, the second coupling structure 260 is connected to the proof mass 230. The first coupling structure 250 and the second coupling structure 260 are both elastic coupling structures.

Of course, in an alternative embodiment, the two oppositely disposed seesaw structures (210, 220) may also be disposed asymmetrically that they are coupled and connected on the first side through the first coupling structure 250. A specific configuration may be selected based on an actual situation, which will not be described one by one here.

In the embodiment, each pair of oppositely disposed seesaw structures (210, 220) includes a first seesaw structure 210 and a second seesaw structure 220. The first seesaw structure 210 includes: a first anchor point 211 with one end fixed to the base, a first elastic torsion spring 212 fixed on the other end of the first anchor point 211, and two first electrode plate disposing portions A 213a and B 213b disposed oppositely on two opposite sides of the first elastic torsion spring 212. The first electrode plate disposing portion A 213a and the first electrode plate disposing portion B 213b are respectively connected to the first elastic torsion spring 212 through a first connecting beam 214. A first end of the first connecting beam 214 close to one side of the first coupling structure 250 is connected to the first elastic torsion spring 212, and a second end of the first connecting beam 214 is connected to one of the first coupling structures 250. The out-of-plane displacement detection component 240 includes first out-of-plane detection electrode plates A 241a and B241b respectively disposed to correspond to the first electrode plate disposing portions A 213a and B 213b.

The second seesaw structure 220 includes: a second anchor point 221 with one end fixed to the base, a second elastic torsion spring 222 fixed on the other end of the second anchor point 221, and two second electrode plate disposing portions A 223a and B 223b oppositely disposed on two opposite sides of the second elastic torsion spring 222. The second electrode plate disposing portion A 223a and the second electrode plate disposing portion B 223b are respectively connected to the second elastic torsion spring 222 through a second connecting beam 224. An out-of-plane displacement detection component 240 further includes second out-of-plane detection plates A 242a and B 242b respectively disposed to correspond to the second electrode plate disposing portions A 242a and B 242b.

Second Embodiment

Figure 5:
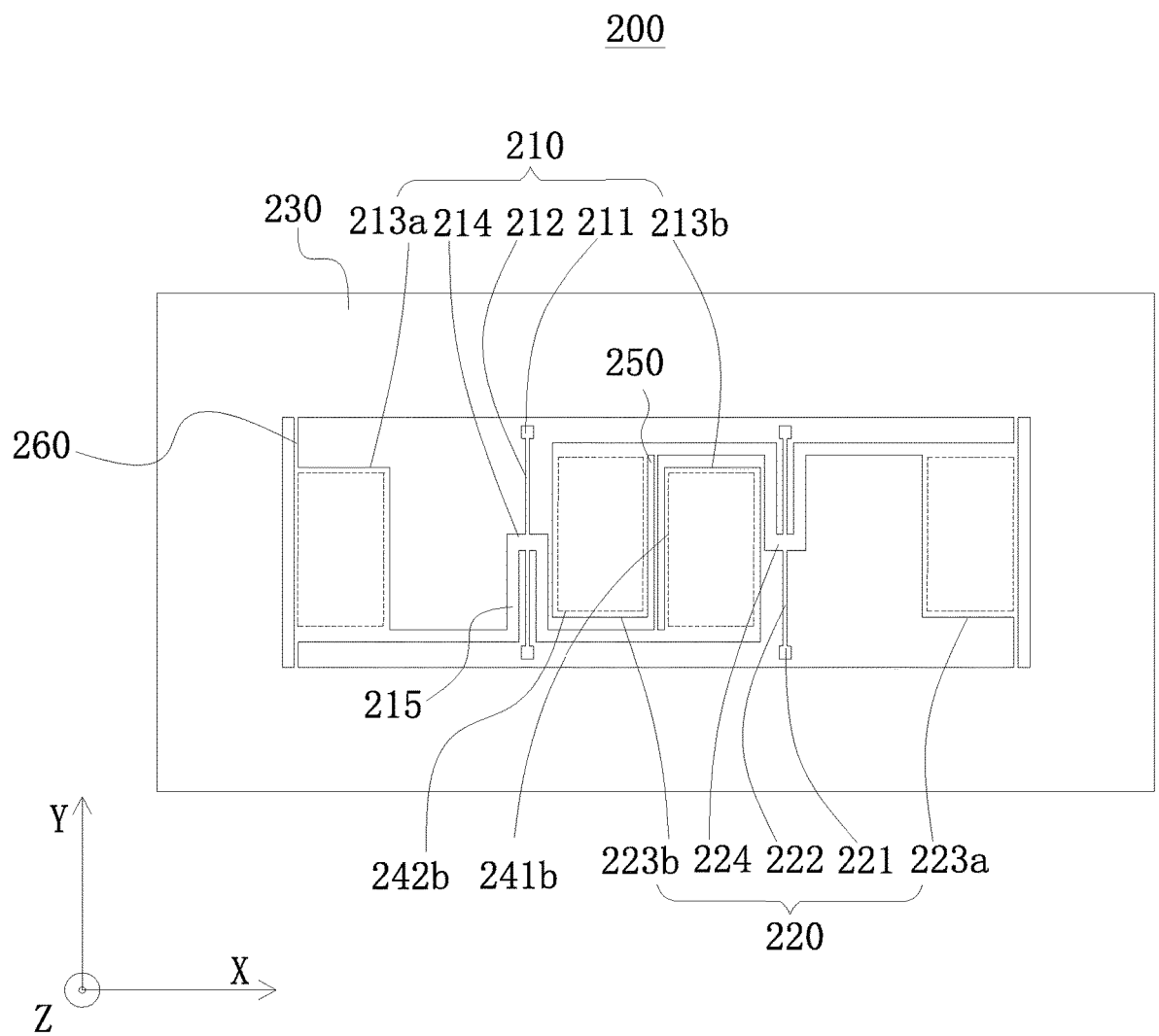
FIG. 5 is a schematic diagram of an accelerometer according to a second embodiment of the present disclosure.
Figure 6:
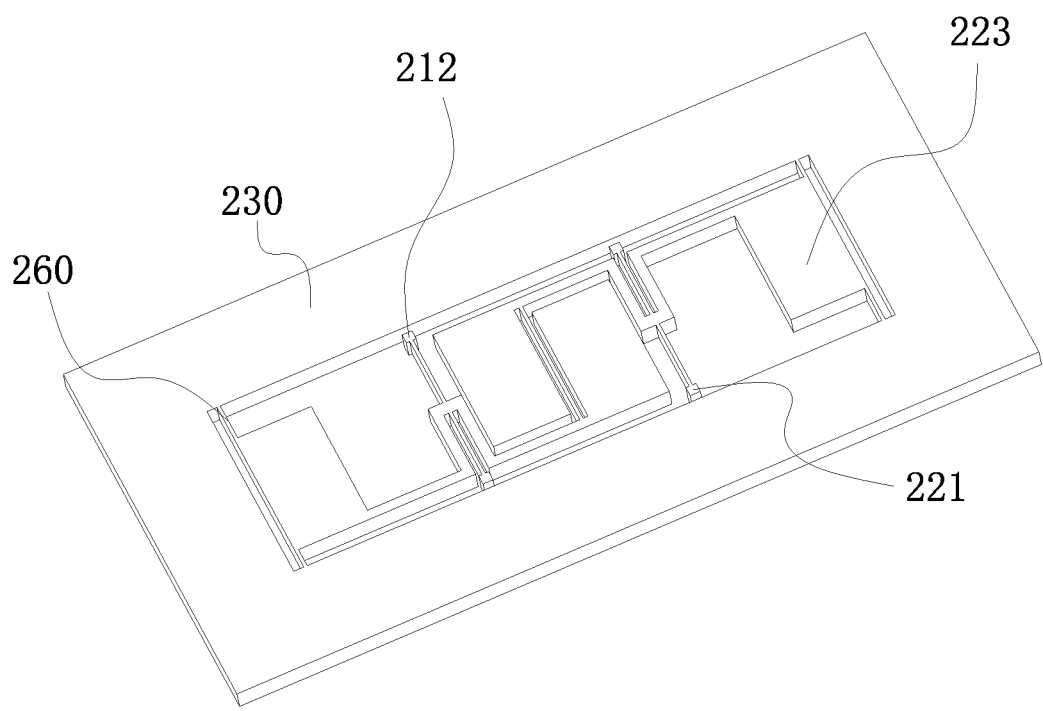
FIG. 6 is a schematic diagram of the accelerometer according to the second embodiment in one other view.

As shown in FIGS. 5 and 6, a difference from the first embodiment is that one first electrode plate disposing portions B 213b is disposed between one second electrode plate disposing portions B 223b and one second elastic torsion spring 222, and one second electrode plate disposing portions B 223b is disposed between one first electrode plate disposing portions B 213b and one first elastic torsion spring 212, thus forming a structure in which one first electrode plate disposing portions B 213b of the first seesaw structure 210 and one second electrode plate disposing portions B 223b of the second seesaw structure 220 are nested with each other. The first coupling structure 250 is disposed between the first electrode plate disposing portion B 213b and the second electrode plate disposing portion B 223b nested to each other.

Further, due to the symmetry of the seesaw structure, the first connecting beam 214 of the first seesaw structure 210 is provided with a first bending portion 215 to avoid the second electrode plate disposing portion B 223b of the second seesaw structure 220. Likewise, the second connecting beam 224 of the second seesaw structure 220 is provided with a second bending portion 225 to avoid the first plate disposing portion B 213b.

In the embodiment, compared with the first embodiment, the out-of-plane capacitance detection plate is further away from the rotating shaft, so greater gains can be obtained.

Third Embodiment

Figure 7:
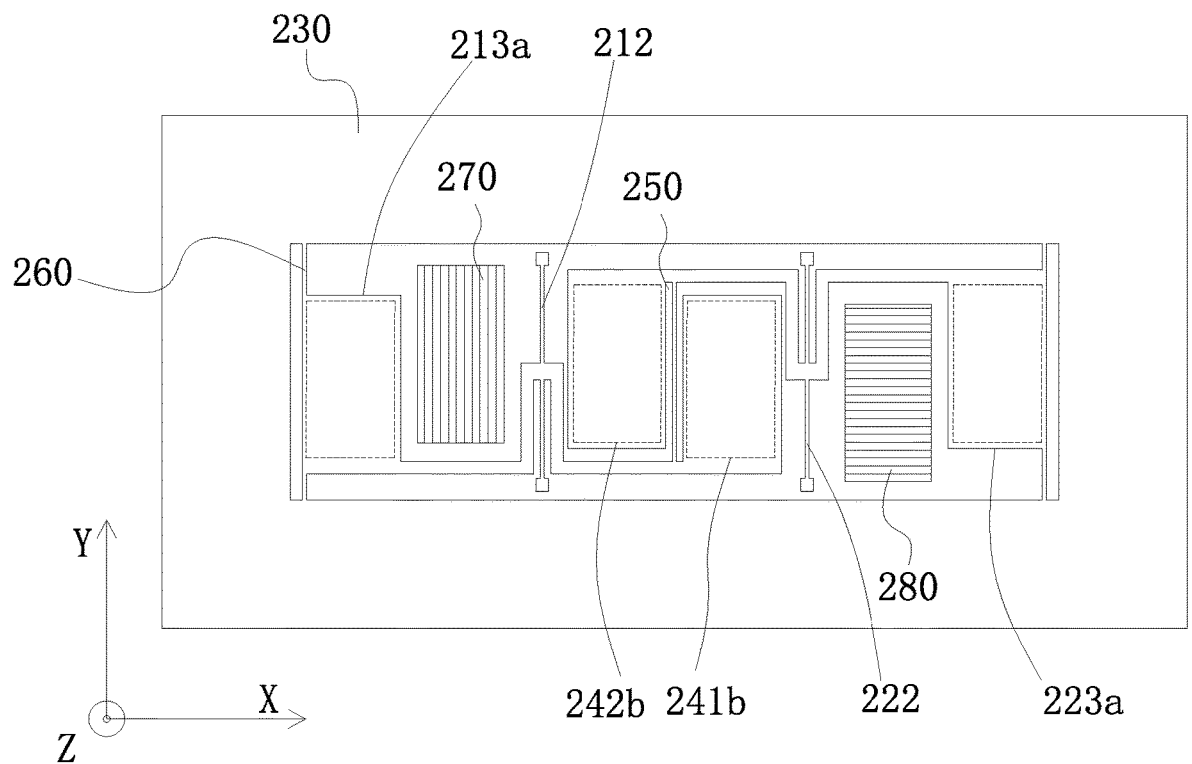
FIG. 7 is a schematic diagram of an accelerometer according to a third embodiment of the present disclosure.

The difference from the second embodiment is that, in the embodiment, as shown in FIG. 7, and referring to FIG. 5, an out-of-plane displacement detection component formed together via the surface formed by a first out-of-plane detection pad A 241a, a first out-of-plane detection pad B241, a second out-of-plane detection pad A 242a, and a second out-of-plane detection pad B 242b is a Z-axis displacement detection component. At the same time, an X-axis acceleration detection component 270 is provided between another first electrode plate disposing portion A 213a of the first seesaw structure 210 and the first elastic torsion spring 212, and is configured to detect acceleration in the X-axis direction. A Y-axis acceleration detection component 280 is provided between another second electrode plate disposing portion 223a of the second seesaw structure 220 and the second elastic torsion spring 222, and is configured to detect acceleration in the Y-axis direction. Of course, the positions of the X-axis acceleration detection component 270 and the Y-axis acceleration detection component 280 can be interchanged, and the X-axis acceleration detection component 270 and the Y-axis acceleration detection component 280 can also be set either or both, which can be set as required

Fourth Embodiment

Figure 8:
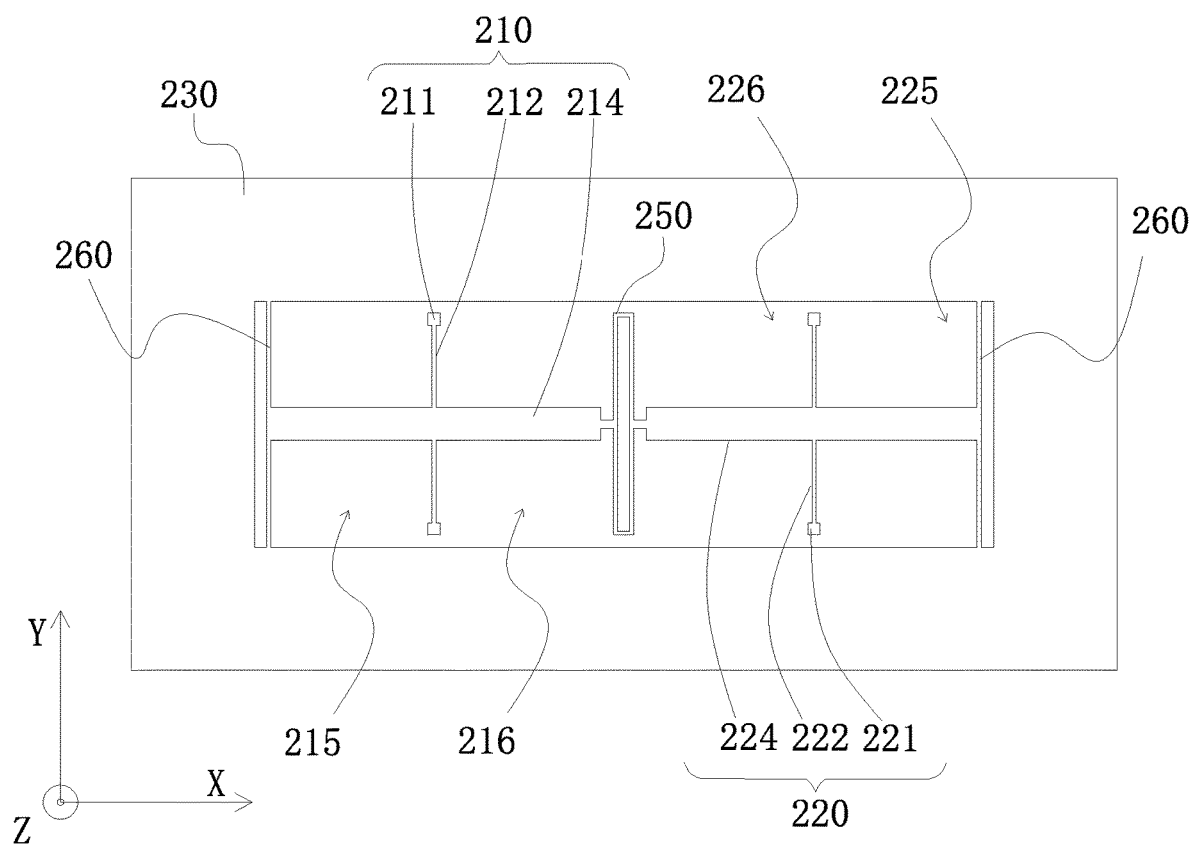
FIG. 8 is a schematic diagram of an accelerometer according to a fourth embodiment of the present disclosure.

As shown in FIG. 8, in the embodiment, each pair of seesaw structures oppositely disposed includes a first seesaw structure 210 and a second seesaw structure 220. The first seesaw structure includes a first anchor point 211, a first elastic torsion spring 212 fixed on the first anchor point 211 and two first connecting beams 214 oppositely located on both sides of the first elastic torsion spring 212. A first end of the first connecting beams 214 located on the side close to the first coupling structure 250 is connected to the first elastic torsion spring 212, a second end of the first connecting beams 214 is connected to one of the first coupling structures 250; and a first end of the first connecting beam 214 located on the side away from the first coupling structure 250 is connected to the elastic torsion spring 212, a second end of the first connecting beam 214 is connected to one of second coupling structures 260.

The second seesaw structure 220 includes a second anchor point 221, a second elastic torsion spring 222 fixed on the second anchor point 221, and two second connecting beams 224 oppositely disposed on both sides of the second elastic torsion spring 222. A first end of each of the second connecting beams 224 located on the side close to the first coupling structure 250 is connected to the first elastic torsion spring 212, a second end of each of the second connecting beams 214 is connected to one of the first coupling structures 250; and a first end of each of the second connecting beams 224 disposed on the side away from the first coupling structure 250 is connected to the second elastic torsion spring 222, and a second end of each of the second connecting beams 224 is connected to the other one of the second coupling structures 260.

Different from the above-mentioned embodiments, in the embodiment, the displacement detection component is not disposed on the seesaw structure. Based on the seesaw structure of this embodiment, the out-of-plane displacement detection of the proof mass can be detected by disposing a capacitance detection plate on the proof mass (upper surface or lower surface). The out-of-plane displacement detection of the proof mass can also be detected by disposing an optical interferometry component.

Fifth Embodiment

Based on the fourth embodiment and referring to FIG. 8, a first accommodation space A 215 is formed among the first elastic torsion spring 211, the second coupling structure 260 located on one side of the first seesaw structure 210 and the first connecting beam 214. A first accommodating space B 216 is formed among the first elastic torsion spring 211, the first coupling structure 250, and the first connecting beam 214.

A second accommodating space A 225 is formed between the second elastic torsion spring 222, the second coupling structure 260 on one side of the second seesaw structure 220, and the second connecting beam 224. A second accommodating space B 226 is formed between the second elastic torsion spring 222, a coupling structure 250 and the second connecting beam 224.

Figure 9:
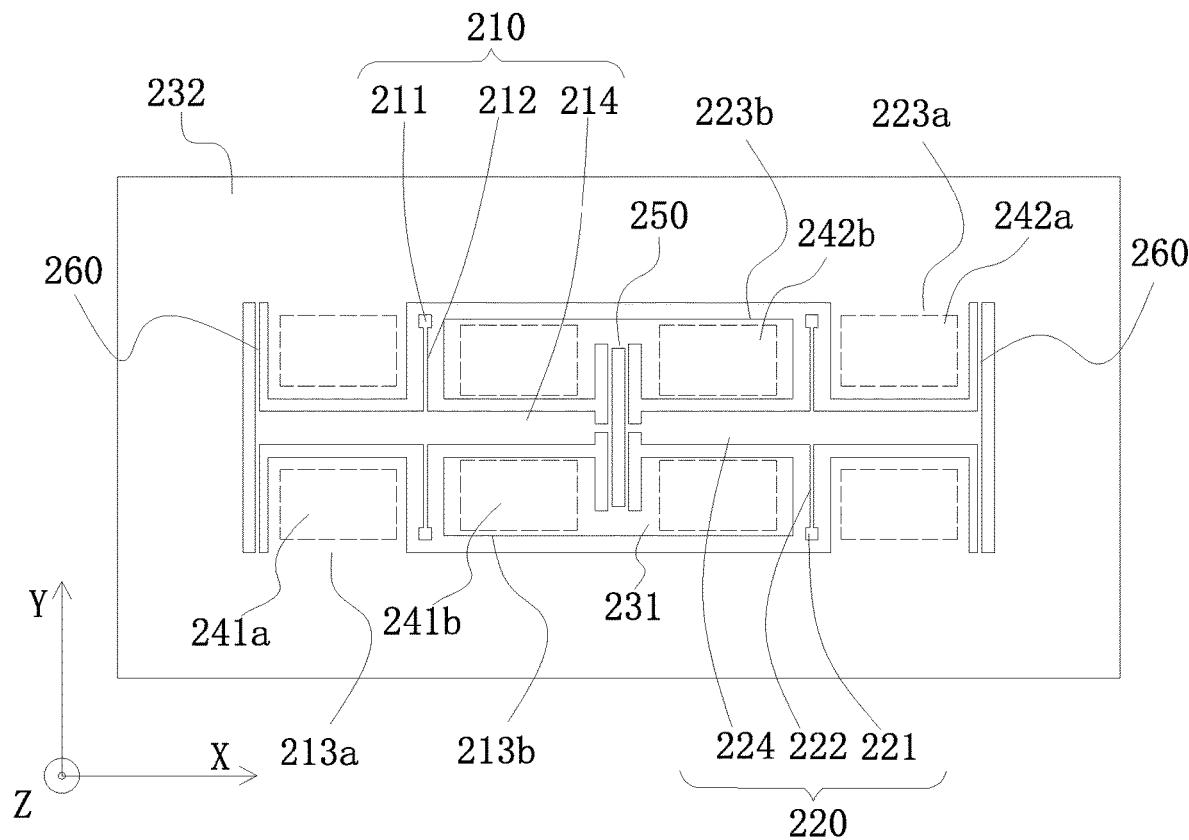
FIG. 9 is a schematic diagram of an accelerometer according to a fifth embodiment of the present disclosure.

As shown in FIG. 9 and in conjunction with FIG. 8, different from the fourth embodiment, in the embodiment, the proof mass includes a second proof mass 232 connected to the second coupling structure 260 and a first proof mass 231 connected to the first coupling structure 250.

A first electrode plate disposing portion A 213a extending from the second proof mass 232 is provided within the first accommodating space A 215, and a first electrode plate disposing portion B 213b extending from the first proof mass 231 is provided within the first accommodating space B 216. The out-of-plane displacement detection component includes a first out-of-plane detection plate A 241a and a first out-of-plane detection plate B 241b respectively disposed on the first plate disposing portion A 213a and the first plate disposing portion B 213b.

A second electrode plate disposing portion A extending from the second proof mass is provided within the second accommodating space A, and a second electrode plate B extending from the first proof mass is provided within the second accommodating space B. The out-of-plane displacement detection component includes a second out-of-plane detection plate A and a second out-of-plane detection plate B respectively disposed on the second plate disposing portion A and the second plate disposing portion B.

In the embodiment, proof masses (the first proof mass 231 and the second proof mass 232) are both provided within the first coupling structure 250 and the second coupling structure 260. At the same time, capacitance detection plates are provided on both the first proof mass 231 and the second proof mass 232. A differential capacitance can be formed between the capacitance detection plates on the second proof mass 232 and the second proof mass 231, and the masses counteract each other at the same time. The advantage of this structure is that the displacement of the out-of-plane capacitance detection plate becomes linear displacement, which improves the linearity of acceleration detection. At the same time, the out-of-plane capacitance detection plate is located at the top of the seesaw structure, and the gain from acceleration to capacitance change is guaranteed.

Six Embodiment

Figure 10:
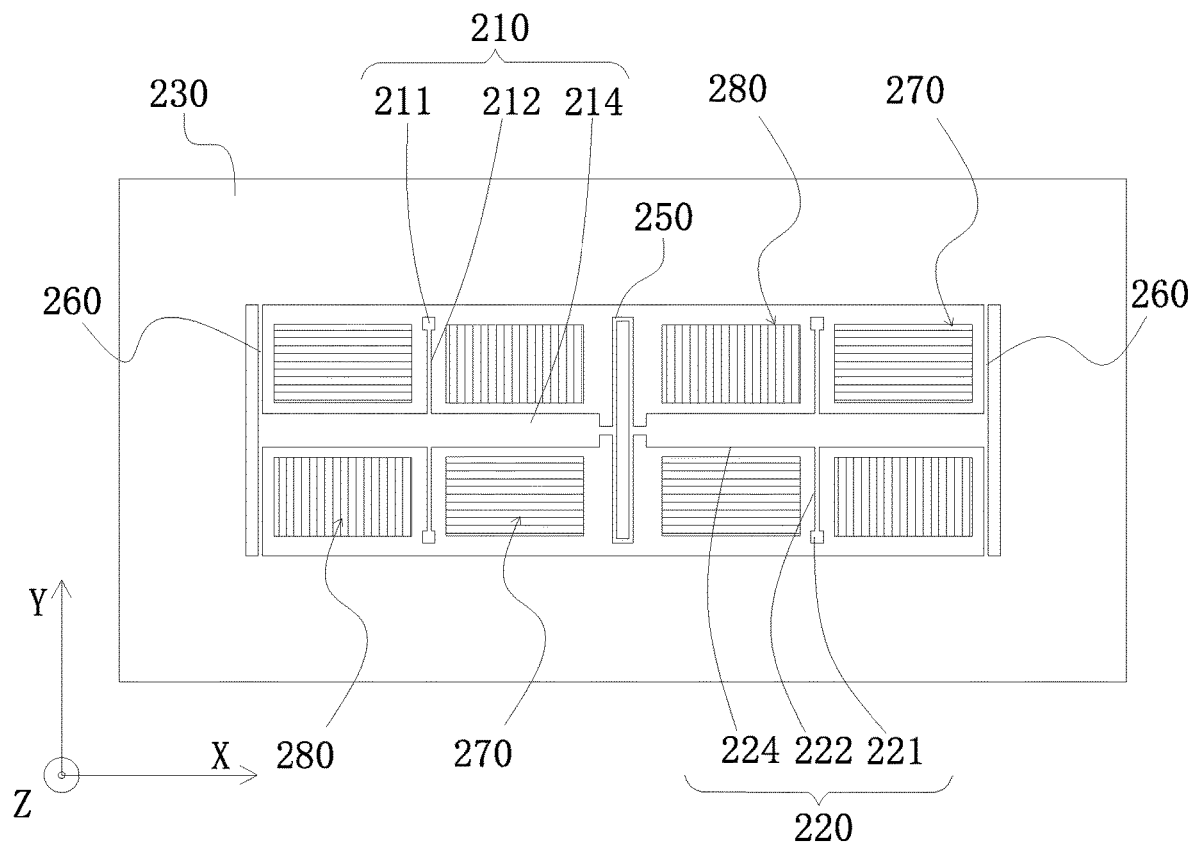
FIG. 10 is a schematic diagram of an accelerometer according to a sixth embodiment of the present disclosure.

As shown in FIG. 10, this embodiment is a specific embodiment of an arrangement of out-of-plane displacement detection components based on the fourth embodiment. Referring to FIG. 8 in conjunction with FIG. 10, a first accommodation space A 215 is formed among the first elastic torsion spring 211, the second coupling structure 260 on one side of the first seesaw structure 210, and the first connecting beam 214. A first accommodating space B 216 is formed among the first elastic torsion spring 211, the first coupling structure 250 and the first connecting beam 214.

A second accommodating space A 225 is formed among the second elastic torsion spring 211, the second coupling structure 260 on one side of the first seesaw structure 210, and the second connecting beam 224. A second accommodating space B 226 is formed among the second elastic torsion spring 222, the first coupling structure 250 and the first connecting beam 214.

The out-of-plane displacement detection component is a Z-axis displacement detection component, which may be an out-of-plane capacitance detection electrode plate or other optical detection components disposed on the proof mass. The first accommodating space A 215, the first accommodating space B 216, the second accommodating space A 225, and the second accommodating space B 226 are respectively provided within an X-axis acceleration detection component 217 and/or a Y-axis acceleration detection component 218.

As an alternative embodiment, the proof mass 230 can also be slotted to place the X-axis acceleration detection component 270 and/or the Y-axis acceleration detection component 280.

Seventh Embodiment

Figure 11:
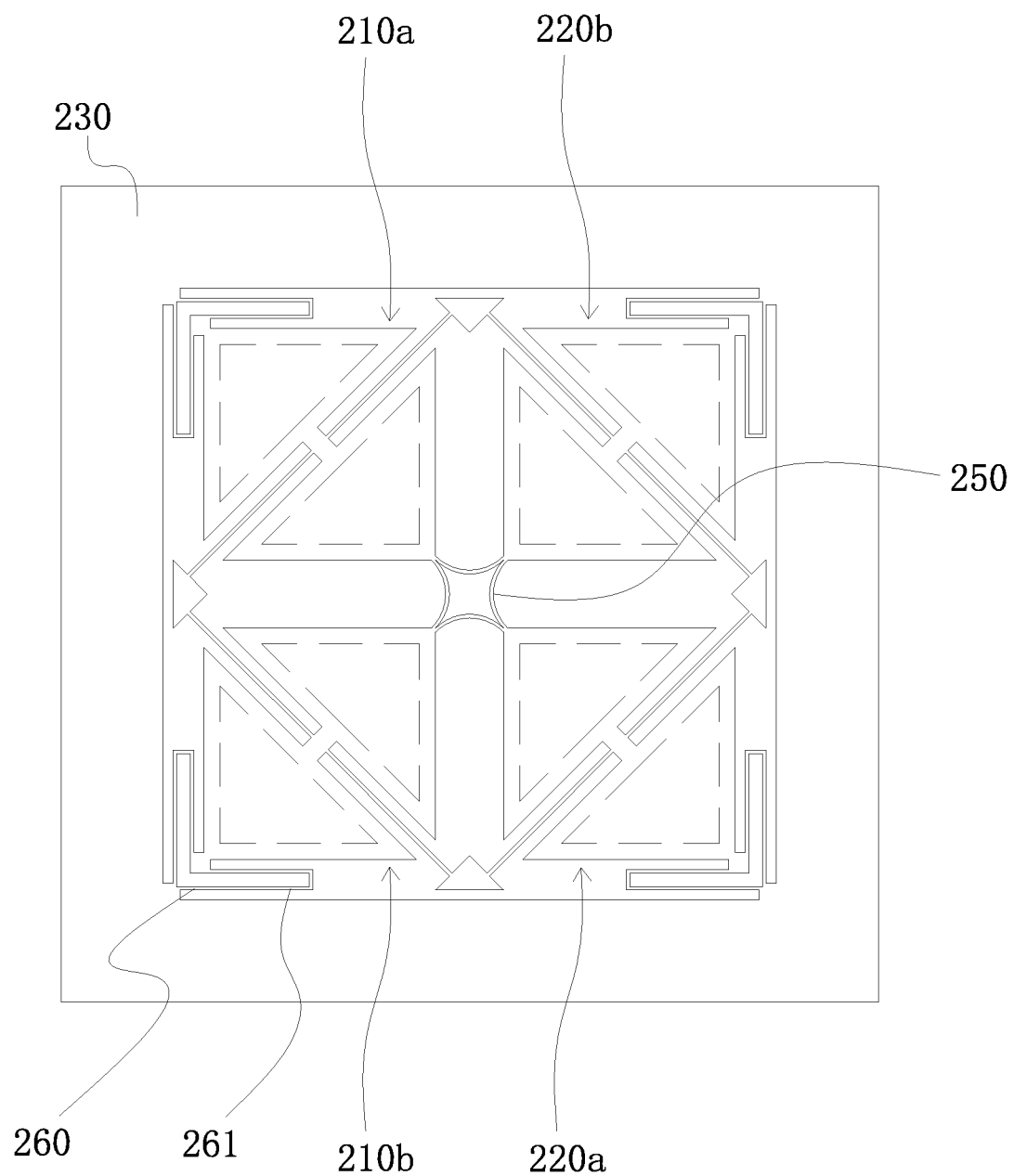
FIG. 11 is a schematic diagram of an accelerometer according to a seventh embodiment of the present disclosure.

It is different from the above-mentioned embodiments is that in the above-mentioned embodiments, a pair of seesaw structures is disposed, while two pairs of seesaw structures are disposed in the embodiment. As shown in FIG. 11, the MEMS accelerometer includes two pairs of seesaws oppositely disposed. They are respectively a first seesaw structure 210a, a second seesaw structure 220a, a first seesaw structure 210b, and a second seesaw structure 220b. The two pairs of seesaw structures oppositely disposed share a first coupling structure 250.

In the embodiment, the first coupling structure 250 includes four symmetrically disposed connection points, and the two pairs of seesaw structures (210, 220) oppositely disposed are respectively connected to the four connection points to form a cross-disposed symmetrical structure.

On a plane, each seesaw structure is disposed in a square shape, and the two pairs of seesaw structures includes 4 seesaw structures, which are crossed on the plane to form a square occupied area, and the proof mass 230 is disposed around an outer periphery of the four seesaw structures. Of course, the shape of each seesaw structure is not limited to the pattern provided in the embodiment.

In the embodiment, the second coupling structure 260 is an elastic coupling structure with at least one bending portion 261. As shown in FIG. 11, In the embodiment, one bending portion 261 is adopted, then the second coupling structure 260 is formed in a U shape, which makes it easier for the proof mass 230 to drive the seesaw structure to rotate.

In the embodiment, the arrangement of four seesaw structures is adopted to make the structure more reasonable and better suppress the motion of the non-sensitive axis mode, and at the same time, more out-of-plane capacitance detection plates can be disposed to provide greater gain.

Eight Embodiment

Figure 12:
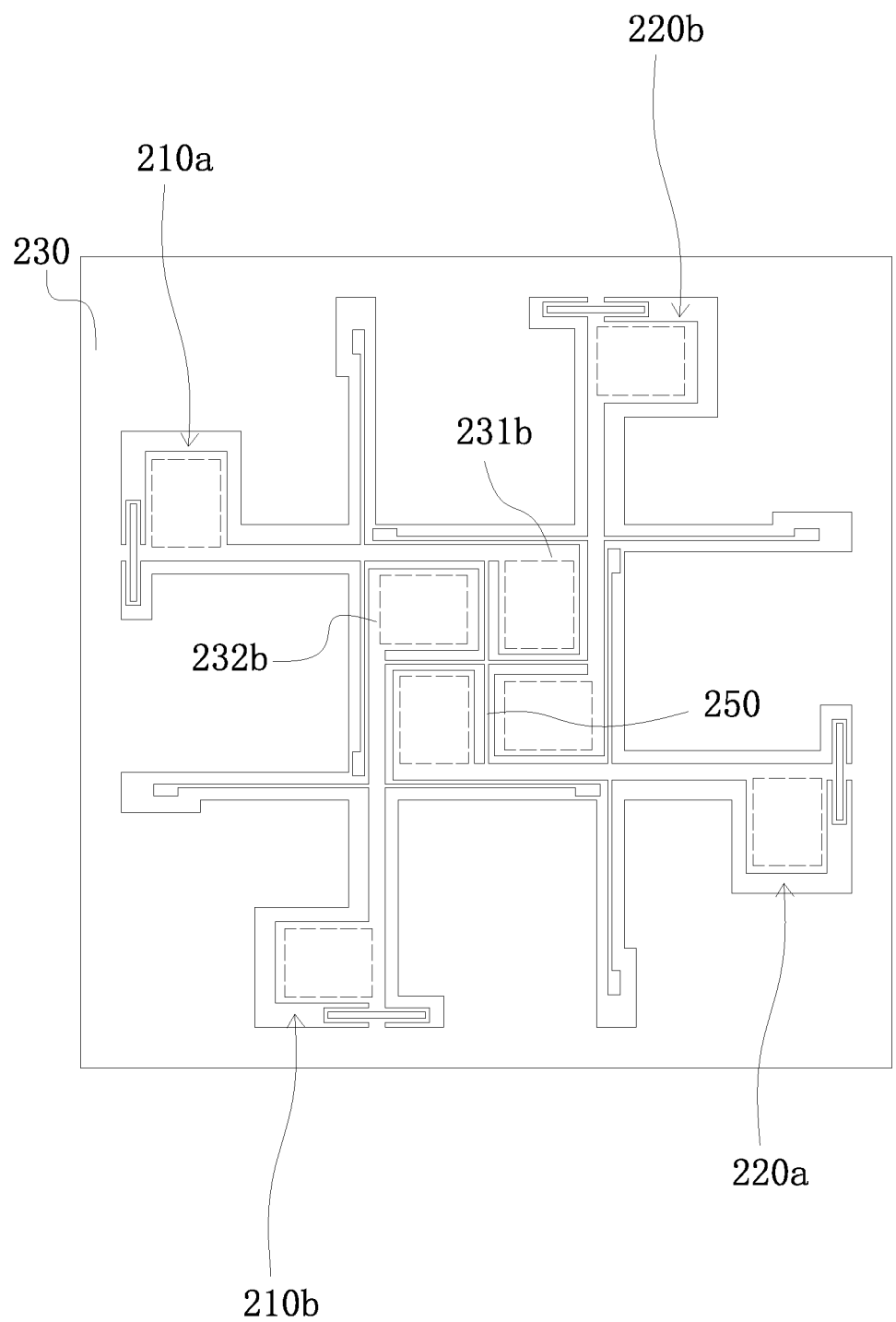
FIG. 12 is a schematic diagram of an accelerometer according to an eighth embodiment of the present disclosure.

As shown in FIG. 12, in the embodiment, a plurality of pairs of seesaw structures similar to those in the seventh embodiment are adopted, however a difference is that a nested structure similar to that in the second embodiment is adopted. That is, one first electrode plate disposing portion B231b in one pair of seesaw structures and one second electrode plate disposing portion B232b of the other pair of seesaw structures form a mutually nested disposing structure.

In the embodiment, by adopting the nested arrangement, the out-of-plane capacitance detection plate is kept away from the rotating shaft so that a greater gain can be obtained, and the structure is more compact.

Ninth Embodiment

Figure 13:
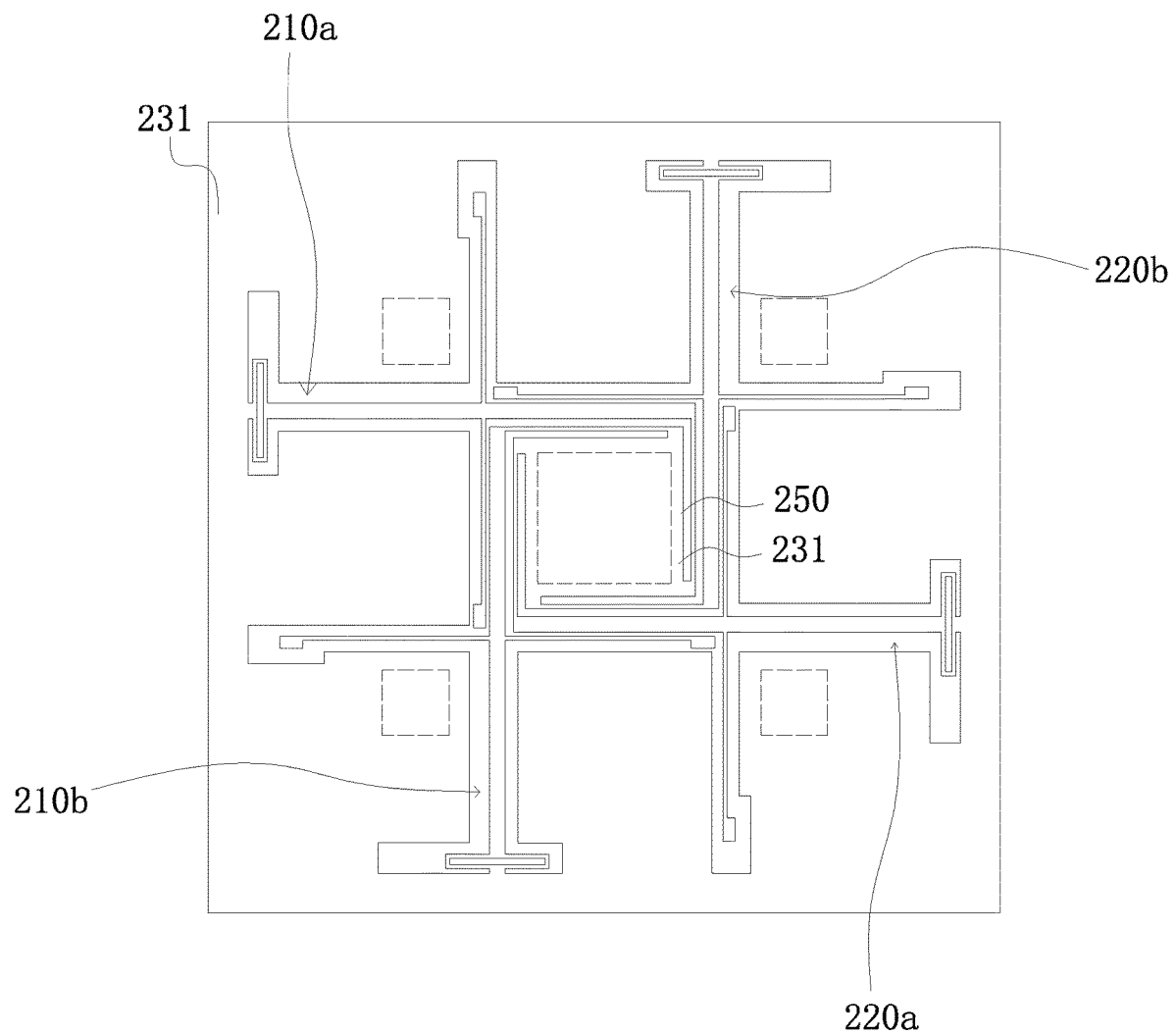
FIG. 13 is a schematic diagram of an accelerometer according to a ninth embodiment of the present disclosure.

As shown in FIG. 13, a difference from the eighth embodiment is that the seesaw structure is not provided with the out-of-plane capacitance detection plates, and the out-of-plane capacitance detection plates are disposed on the second proof mass 232 and the first proof mass 231. The first proof mass 231 is an integral structure with the first coupling structure 250.

Based on the above embodiments, in each embodiment of the present disclosure, the proof mass may be the second proof mass 232 disposed only on the second coupling structure 260 or the first proof mass 231 disposed only on the first coupling structure 250.

Based on the above embodiments, in each embodiment of the present disclosure, the second proof mass 232 can be disposed symmetrically around the seesaw structure, or can be disposed independently like the first proof mass 231.

Based on the above embodiments, in embodiments of the present disclosure, the number of seesaw structures can be even, and a symmetrical arrangement is achieved through the first coupling structure.

Based on the above embodiments, in the embodiment of the present disclosure, the out-of-plane displacement detection component may be an out-of-plane capacitive detection plate, other optical detection components, or other types of displacement detection components.

Based on the above embodiments, in the embodiment of the present disclosure, the out-of-plane displacement detection components may be disposed on the proof masses, may also be disposed on the seesaw structures, or disposed on the first coupling structure.

Compared with the related art, in the MEMS accelerometer of each embodiment of the present disclosure, two or more seesaw structures are adopted as the structures supporting the proof mass, so that the proof mass moves linearly along the Z axis under the action of acceleration in the out-of-plane direction (Z direction), This linear displacement is not only beneficial to improve the linearity of a capacitive displacement detection, but also to other non-capacitive detection methods, such as optical displacement detection. In addition, in the embodiment of the present disclosure, a double coupling structure (a first coupling structure and a second coupling structure) is adopted to jointly couple the rotation of the seesaws, and the remaining translational and rotational modes of the seesaw structures are suppressed. Furthermore, in embodiments of the present disclosure, the proof mass is mainly disposed on the second coupling structure (outside) (it may also be the first coupling structure inside), and the seesaw structure is disposed with a small amount or no rotating proof masses, so that the mass center of the seesaw structure is close to or at the axis of rotation. This arrangement of proof mass results in a more concentrated mass, a more reasonable structure, and fewer spurious modes.

Although some above embodiments of the present disclosure have been described in detail through examples, it should be understood by a person skilled in the art that the above embodiments can be modified without departing from the scope and spirit of the present disclosure. The scope of the present disclosure is defined by the attached claims.

What is claimed is:

1. A Micro-Electro-Mechanical-Systems (MEMS) accelerometer, comprising:
a base;
proof mass;
at least one pair of seesaw structures;
an out-of-plane displacement detection component;
wherein the at least one pair of seesaw structures are oppositely disposed and fixed on the base through anchor points; the out-of-plane displacement detection component is configured to detect rotation of the at least one pair of seesaw structures or out-of-plane linear motion of the proof mass; the at least one pair of seesaw structures is coupled and connected to each other on a first side of the at least one pair of seesaw structures through a first coupling structure, a second side of the at least one pair of seesaw structures coupled and connected to each other by the first coupling structure is respectively provided with a second coupling structure, the first coupling structure and the second coupling structure are elastic coupling structures; wherein the proof mass is connected to the first coupling structure or the proof mass is connected to the second coupling structure; the at least one pair of seesaw structures comprises: a first seesaw structure; and a second seesaw structure;
wherein the first seesaw structure comprises a first anchor point, a first elastic torsion spring, and a first connecting beam; the first anchor point is fixed to the base, the first elastic torsion spring is fixed to the first anchor point, and the first connecting beam is disposed across two sides of the first elastic torsion spring; and a first end of the first connecting beam is connected to the first elastic torsion spring, where the first end is far away from the first coupling structure, and a second end of the first connecting beam is connected to the second coupling structure; the second seesaw structure comprises a second anchor point, a second elastic torsion spring, and a second connecting beam; a first end of the second anchor point is fixed to the base, the second elastic torsion spring is fixed to a second end of the second anchor point, and the second connecting beam is disposed on one side of the second elastic torsion spring; a first end of the second connecting beam is connected to the second elastic torsion spring where the first end of the second connecting beam is far away from the first coupling structure, and a second end of the second connecting beam is connected to the second coupling structure; and the second coupling structure is connected to the proof mass.

2. The MEMS accelerometer according to claim 1, wherein the pair of seesaw structures comprises:
a first seesaw structure; and
a second seesaw structure;
wherein the first seesaw structure comprises a first anchor point, a first elastic torsion spring, a first electrode plate disposing portion A, and a first electrode plate disposing portion B; the first anchor point is fixed to the base, the first elastic torsion spring is fixed to the first anchor point, and the first electrode plate disposing portion A and the first electrode plate disposing portion B are oppositely disposed on two sides of the first elastic torsion spring, the first electrode plate disposing portion A and the first electrode plate disposing portion B are respectively connected to the first elastic torsion spring via a first coupling beam; the out-of-plane displacement detection component comprises a first out-of-plane detection electrode plate A disposed on the first electrode plate disposing portion A and a first out-of-plane detection electrode plate B disposed on the first electrode plate disposing portion B; the second seesaw structure comprises a second anchor point, a second elastic torsion spring, a second electrode plate disposing portion A, and a second electrode plate disposing portion B; a first end of the second anchor point is fixed to the base, the second elastic torsion spring is fixed to a second end of the second anchor point, and the second electrode plate disposing portion A and the second electrode plate disposing portion B are oppositely disposed on two sides of the second elastic torsion spring, the second electrode plate disposing portion A and the second electrode plate disposing portion B are respectively connected to the second elastic torsion spring via a second coupling beam; the out-of-plane displacement detection component comprises a second out-of-plane detection electrode plate A disposed on the second electrode plate disposing portion A and a second out-of-plane detection electrode plate B disposed on the second electrode plate disposing portion B.

3. The MEMS accelerometer according to claim 2, wherein the first electrode plate disposing portion B is disposed between the second electrode plate disposing portion B and the second elastic torsion spring; the second electrode plate disposing portion B is disposed between the first electrode plate disposing portion B and the first elastic torsion spring, thus forming a structure in which the first electrode plate disposing portions B of the first seesaw structure and the second electrode plate disposing portions B of the second seesaw structure are nested with each other, the first coupling structure is disposed between the first electrode plate disposing portion B and the second electrode plate disposing portion B, where the first electrode plate disposing portion B and the second electrode plate disposing portion B are nested with each other.

4. The MEMS accelerometer according to claim 3, wherein a first bending portion is disposed on the first connecting beam to avoid the second electrode plate disposing portion B; a second bending portion is disposed on the second connecting beam to avoid the first plate disposing portion B.

5. The MEMS accelerometer according to claim 3, wherein the out-of-plane displacement detection component is a Z-axis displacement detection component, X-axis displacement detection components and/or Y-axis displacement detection components are disposed between the first electrode plate disposing portion A and the first elastic torsion spring and between the second electrode plate disposing portion A and the second elastic torsion spring.

6. The MEMS accelerometer according to claim 1, further comprising two pairs of the seesaw structures oppositely disposed, the two pairs of the seesaw structures share the same first coupling structure.

7. The MEMS accelerometer according to claim 6, wherein the second coupling structure is an elastic coupling structure having at least one bent portion.

8. The MEMS accelerometer according to claim 1, wherein the proof mass comprises a first proof mass and a second proof mass, the first coupling structure and the second coupling structure are respectively connected to the first proof mass and the second proof mass.

9. The MEMS accelerometer according to claim 8, wherein the pair of seesaw structures comprises:
   a first seesaw structure; and
   a second seesaw structure;
   wherein the first seesaw structure comprises a first anchor point, a first elastic torsion spring, and a first connecting beam; the first elastic torsion spring is fixed to the first anchor point, and the first connecting beam is disposed across two sides of the first elastic torsion spring; and a first end of the first connecting beam is connected to the first elastic torsion spring, and a second end of the first connecting beam is connected to one of the second coupling structure; the second seesaw structure comprises a second anchor point, a second elastic torsion spring, a second connecting beam; the second elastic torsion spring is fixed to the second anchor point, and the second connecting beam is disposed on one side of the second elastic torsion spring; a first end of the second connecting beam is connected to the second elastic torsion spring, and a second end of the second connecting beam is connected to other one of the second coupling structure;
   a first accommodation space A is formed among the first elastic torsion spring, the second coupling structure disposed on one side of the first seesaw structure, and the first connecting beam; a first accommodating space B is formed among the first elastic torsion spring, the first coupling structure, and the first connecting beam;
   a second accommodating space A is formed among the second elastic torsion spring, the second coupling structure disposed on one side of the first seesaw structure, and the second connecting beam; a second accommodating space B is formed among the second elastic torsion spring, the first coupling structure, and the first connecting beam;
   a first electrode plate disposing portion A is disposed in the first accommodating space A, where the electrode plate disposing portion A extends from the second proof mass, and a first electrode plate disposing portion B is disposed in the first accommodating space B, where the first electrode plate disposing portion B extends from the first proof mass; the out-of-plane displacement detection component comprises a first out-of-plane detection plate A disposed on the first electrode plate disposing portion A and a first out-of-plane detection plate B disposed on the first electrode plate disposing portion B; and
   a second electrode plate disposing portion A is disposed in the second accommodating space A, where the second electrode plate disposing portion A extends from the second proof mass, and a second electrode plate disposing portion B is disposed in the second accommodating space B, where the second electrode plate disposing portion B extends from the first proof mass, the out-of-plane displacement detection component comprises a second out-of-plane detection plate A disposed on the second electrode plate disposing portion A and a second out-of-plane detection plate B disposed on the second electrode plate disposing portion B.

10. The MEMS accelerometer according to claim 9, the out-of-plane displacement detection component is a Z-axis displacement detection component; X-axis displacement detection components and/or Y-axis displacement detection components are respectively disposed in the first accommodation space A, the first accommodation space B, the second accommodation space A, and the second accommodation space B.

11. The MEMS accelerometer according to claim 8, further comprising the two pairs of the seesaw structures disposed oppositely to each other, two pairs of the seesaw structures share the same first coupling structure.

\* \* \* \* \*